Oct. 13, 1936.                    A. KEEFE                    2,057,195
                                  AIR VALVE
                             Filed May 15, 1936              2 Sheets-Sheet 1
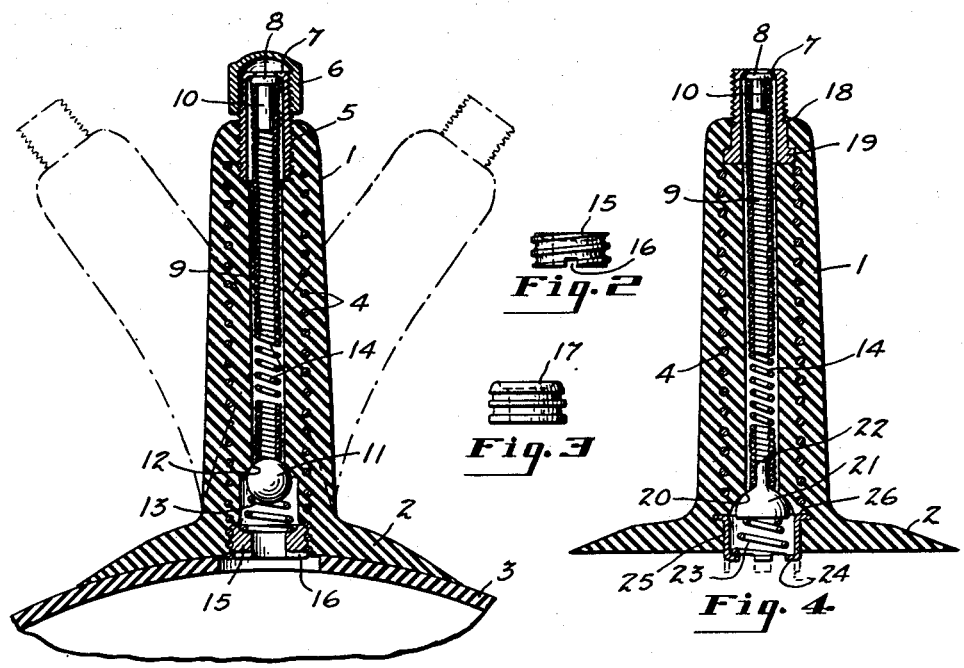
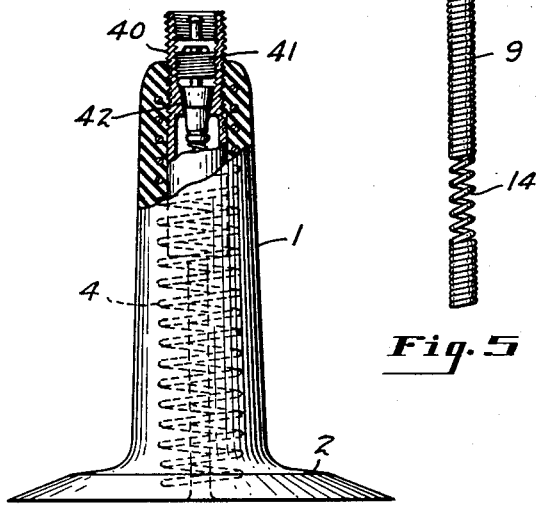
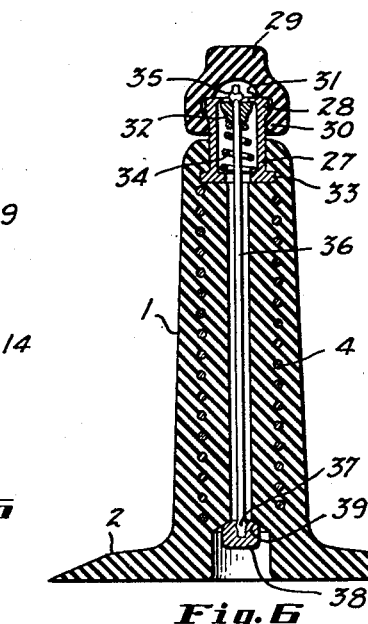
INVENTOR
*Arthur Keefe*
BY
O.Z. McCoy
ATTORNEY Oct. 13, 1936.  A. KEEFE  2,057,195
AIR VALVE
Filed May 15, 1936  2 Sheets-Sheet 2

INVENTOR
*Arthur Keefe*
BY
*O.Z.McCoy*
ATTORNEY

Patented Oct. 13, 1936

2,057,195

UNITED STATES PATENT OFFICE 2,057,195

AIR VALVE

Arthur Keefe, Akron, Ohio

Application May 15, 1936, Serial No. 79,911

10 Claims. (Cl. 152—12)

This invention relates to air valves and more particularly to a flexible and inexpansible valve stem with air sealing means disposed therein.

Automobile wheel inner tube flexible valve stems, that pass freely thru the valve hole in the wheel rim as a result of the creeping action of the inner tube on the continued use of a deflated tire and that thereby avoid injury to the junction of the stem and the tube, have heretofore had the objectionable characteristic of circumferential expansion during inflation. This characteristic has been particularly objectionable in truck tires in which the tube valve stems are subjected to high internal pressures. Various constructions and devices have been developed with varying degrees of success to overcome this objectionable characteristic. Fabric reinforcement of the valve stem has been used but has been found to be faulty in that air under pressure follows the channels between the fabric fibers and between the fabric and the rubber and promotes their separation.

The present invention comprises a flexible rubber valve stem that has a flexible steel spiral spring embedded in the shaft portion of the valve stem. The rubber body portion of the valve stem is securely vulcanized to the spring wire thruout its length. In this construction the radial expansion of the valve stem is resisted, not only by the radial strength of the spring coils in resisting distortion, but also by the strength of the vulcanization bond of rubber to metal that is continuous thruout the length of the spring wire and that effectually resists any uncoiling of the wire spring due to internal expanding high pressures to which the valve stem is subjected.

An object of the present invention is to provide a flexible valve stem that is reinforced to minimize radial expansion from internal air pressure.

A further object is to provide a flexible valve stem that is reinforced against expansion and that embodies parts that are of practical, simple and easy assembly and manufacture.

A further object is to provide a flexible valve stem that contains air sealing constructions that are unaltered in their function and uninjured by the repeated flexing of the valve stem.

Another object is to provide a flexible valve stem that contains positive acting operating and air sealing means of long life and durability.

With the above and other objects in view, which will be readily apparent from the following detailed description, the present invention consists in a simple construction and combination of parts which will be readily understood by those skilled in the art to which the invention appertains.

In the accompanying drawings, which illustrate suitable embodiments of the invention:

Fig. 1 is an elevation of the flexible valve stem in dotted outline, with an elevational section shown in full lines;

Fig. 2 is an elevation of a valve spring supporting plug shown in Fig. 1;

Fig. 3 is an elevation of another form of valve spring supporting plug that may be used in the construction that is shown in Fig. 1;

Fig. 4 is an elevational section of the valve stem with a variation in the air sealing means construction;

Fig. 5 is an elevation of the flexible thrust member in the valve constructions that are shown in Figs. 1 and 4;

Fig. 6 is an elevational section of the valve stem adapted for a steel wire form of flexible thrust member;

Fig. 7 is an elevation, partly broken away, of a flexible, non-expanding valve stem that is adapted for the use of a conventional valve insides in the distal tip thereof;

Figure 8:
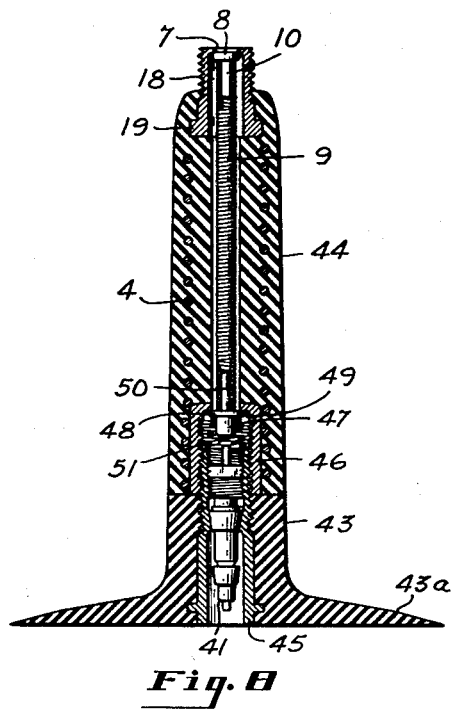
Fig. 8 is a sectional elevation of the reinforced valve stem separated into a base portion and a shaft portion with a conventional valve insides positioned in the base portion.

In the accompanying drawings, the valve stem shaft 1 is preferably integral with the stem base 2, that may be integral with or adhesively secured to an air container, such as the inner tube 3. The distention of the valve stem shaft 1 is minimized by the spirally coiled steel spring 4, that is embedded in and vulcanized to the rubber of the valve stem shaft 1, substantially continuously thruout the length of the wire that forms the embedded spring 4.

The embedded spring 4 may be of any desired degree of strength and stiffness, as determined by the gauge and the strength of the wire of which it is made.

The radial strength of the wire coils and the force of the vulcanization bond between the rubber and the metal of the wire spring must both be overcome before the expansion of the valve stem from internally applied radially directed pressure can result.

The ferrule 5, that is preferably molded into the upper extremity of the valve stem shaft 1, is provided with means for improving its bonded relation with the rubber of the stem shaft 1, as by being threaded externally, which also provides engagement with the internally threaded valve cap 6, where the use of this form of cap is desired.

The ferrule 5 preferably terminates upwardly in the radially inwardly extending continuous dust cap ferrule flange 7, against which the dust cap sealing plug 8 forms dust and water sealing engagement.

The plug 8 is provided with a suitable means for making engagement with a suitable flexible thrust member, such as the spirally wound, substantially collapsed flexible spring thrust member 9, as by the shaft portion 10, that extends into the interior thereof.

The lower end of the flexible thrust member 9 engages a suitable means, such as the spherical valve ball 11, that is pressed into air sealing engagement with the rubber valve seat 12, that forms part of the rubber body portion of the valve stem shaft 1, by suitable means, such as the coil compression spring 13.

The valve ball 11 may be forced out of sealing engagement with the valve seat 12, by pressure applied against the sealing plug 8, that is transmitted along a flexible thrust member 9, to the ball 11. In the preferred form of collapsed spring thrust member 9, if desired, certain of the coils may be separated, as at 14, to compensate for the wear of the rubber valve seat surface 12. In this construction the pressure that is applied to the sealing plug 8 must be of sufficient force to overcome the yield of the spiral separated coils 14 of the spring thrust member 9 and the compression spring 13, before the valve ball 11 will be removed from the valve seat 12. The separation of the coils 14 may be distributed over a greater or less length of the spring thrust member 9 and may be distributed uniformly thruout the length of the spring thrust member 9, if desired.

The pressure that is exerted by the coil spring 13 is in excess of that exerted by the separated coils 14, as by difference in the metal from which the springs are made, the gauge of the wire that is used in the springs, or otherwise, in order that an effectual air seal between the ball 11 and the rubber valve seat 12 may be maintained.

The compression spring 13 is supported in its engagement with the ball 11 by any suitable means, such as by a peripherally grooved plug that may be threaded externally, as the threaded screw plug 15, with the driver slot 16 disposed therein for use in threading the screw plug 15 into position, or the peripherally grooved plug 17, that is forced into position, wherein the plug engages, in its peripheral grooves, a plurality of half-embedded turns of the embedded spring 4. The rubber on either side of the half-embedded turns of the embedded spring 4, preferably contacts the peripheral surfaces on the threads or lands of the plug used, to resist its rotation when in seated position.

In the form of air valve that is illustrated in Fig 4 of the drawings, the ferrule 18 has a radially outwardly extending ferrule anchoring flange 19, that assists in locking the ferrule in the rubber body portion of the valve stem shaft.

The air seal in this construction is effected by the engagement with the rubber valve seat 20, of a substantially semi-spherical valve closure member 21, that is centered in position by suitable means, such as by the shaft portion 22, that is integral therewith and that extends into the interior of the thrust member 9. The valve closure member 21 and its shaft 22, may be made of any suitable material, such as metal, polymerized resins, rubber or the like.

The valve closure member 21 is pressed into seated engagement with the rubber valve seat 20 by the coil compression spring 23, that is supported in position by the tongues 24, that form a part of the spring supporting member 25 and that extend in their dotted line position during the assembly of the inner parts of the valve, and are then bent into their spring supporting position, that is shown in full lines. The member 25 is molded in and vulcanized to the rubber body portion of the valve stem and is anchored into place by the radially outwardly extending peripheral anchoring flange 26.

In the construction that is shown in Fig. 6, the ferrule 27 has a radially outwardly extending ferrule flange 28, that is yieldingly gripped by the rubber valve cap 29, with its inwardly directed peripheral cap flange 30 positioned beneath the ferrule flange 28. The rubber valve cap 29 serves to seal the interior of the valve stem from the admission of dust and water.

The inwardly extending dust seal ferrule flange 31, that forms a part of the ferrule 27, is engaged by the dust cap closure plug 32 in water and dust sealing engagement. The lower end of the ferrule 27 has a preferably continuous ferrule anchoring flange 33 that extends radially outwardly for improving the grip of the rubber of the valve stem in which it is vulcanized on the ferrule 27, and radially inwardly to provide a seat for the compression spring 34, that presses upwardly against the plug 32. The plug 32 bears upwardly against the upper bashed tip 35 of a suitable flexible compression member, such as the flexible steel compression wire 36.

The flexible compression wire 36 terminates downwardly in the lower bashed tip 37, about which the valve closure member 38 is cast. The valve closure member 38 is held in air sealing engagement with the rubber valve seat 39 by force exerted by the compression spring 34. As the valve seat 39 wears, the steel compression wire 36 extends upwardly thru the dust cap closure plug 32. The air valve is opened by pressure that is exerted downwardly on the upper bashed tip 35 of the wire 36.

In the construction that is shown in Fig. 7, the ferrule 40 is threaded internally for the reception of a short type of conventional valve insides 41 and has the frustro-conical inner portion 42, against which a contacting portion of the valve insides 41 makes air sealing engagement.

Figure 9:
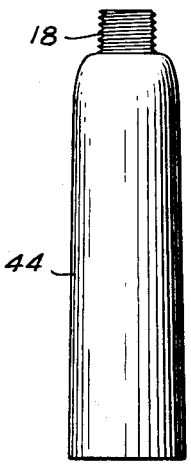
Fig. 9 is an elevation of the removable and reinforced shaft portion of the valve stem that is shown in Fig. 8.
Figure 10:
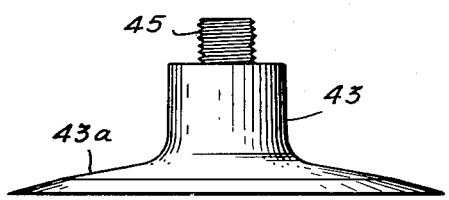
Fig. 10 is an elevation of the base portion of the valve stem that is shown in Fig. 8.

The construction that is shown in Figs. 8–10, inclusive, of the drawings, comprises a valve stem shaft lower portion 43, that has a circumferentially enlarged base portion 43a for attachment to an inner tube, and the valve stem shaft upper portion 44, that are removably secured together to form a valve stem assembly with abutting ends firmly pressed together.

In the construction shown the internally and externally threaded ferrule 45, that is vulcanized within the valve stem shaft lower portion 43, makes threaded engagement with the internally threaded ferrule 46, that is vulcanized within the lower portion of the valve stem shaft upper portion 44. The conventional valve insides 41 is removably mounted within the ferrule 45.

A suitable valve pin depressing means for releasing air enclosed within the inner tube from the air admitting end of the valve stem shaft upper portion 44 is provided.

In the construction shown the valve pin contact member 47 has an outwardly extending flange 48 between its ends for making upwardly directed movement arresting engagement with the under side of the radially inwardly extending peripheral flange 49 on the upper edge of the ferrule 46, and a suitable flexible thrust member 9 engaging portion, such as the pin portion 50 that extends therein. Suitable means for yieldingly supporting the valve pin contact member 47 out of engagement with the valve pin is provided, such as the conical spiral spring 51, that has its larger end positioned against the upper end of the ferrule 45 and its smaller end positioned against the under side of the valve pin contact member flange 48.

As in the previously described constructions, the flexible thrust member 9 delivers pressure exerted against the dust cap plug 8, that makes water and dust sealing engagement with the under side of the flange 7 on the ferrule 18, to the air releasing means, and the embedded spring 4 minimizes the distention of the valve stem shaft upper portion 44.

It is to be understood that the forms of valve stems and valve parts that are disclosed herein, are submitted for purposes of illustration and explanation and that various modifications in the materials, adaptations and uses of the valve stem, valve parts and the like, may be made without departing from the invention as defined in the appended claims.

What I claim is:

1. A flexible valve stem, comprising a flexible rubber body portion, a shaft forming a part of said body portion, and an internal pressure resisting spring embedded in said shaft and vulcanized to said body portion.

2. A flexible valve stem, comprising a flexible rubber body portion, an internal pressure resisting spring embedded in and vulcanized to said body portion, and air sealing means disposed within said valve stem.

3. A flexible valve stem having a shaft that is apertured longitudinally thereof for the passage of air therethru, comprising a flexible shaft portion, an internal pressure resisting coil spring positioned within and vulcanized to said shaft portion, air sealing valve means positioned within said valve stem, and means for opening and closing said valve means.

4. An internal pressure reinforced flexible valve stem, comprising a flexible shaft portion that is apertured longitudinally for the passage of air therethru, a pressure reinforcing continuous coil spring that is embedded within said valve stem shaft and adhesively secured thereto, and air sealing means disposed substantially within said valve stem shaft aperture.

5. A pressure reinforced flexible valve stem, comprising a flexible valve stem shaft portion that is apertured longitudinally for the passage of air therethru, a pressure reinforcing coil spring embedded within said valve stem shaft and adhesively secured thereto, a ferrule disposed at one end of said valve stem shaft, air sealing means disposed within said valve stem, and air sealing means releasing means accessible at said ferrule.

6. A flexible rubber valve stem reinforced against radial pressure, comprising a flexible valve stem shaft portion that is apertured longitudinally for the passage of air therethru, a pressure reinforcing continuous coil spring embedded within said valve stem shaft and vulcanized thereto, a ferrule disposed at one end of said valve stem shaft, an air valve disposed adjacent the base of said valve stem and remote from said ferrule, and means available at said ferrule for releasing said air valve.

7. A flexible valve stem having a base and a tip, comprising a flexible body portion, a spirally wound steel wire spring that extends longitudinally of said valve stem and that is vulcanized thereto substantially thruout the length of said wire spring, air sealing means disposed within said valve stem, and air sealing means releasing means available at said valve stem tip for releasing said air sealing means.

8. A flexible valve stem that is apertured longitudinally thereof for the transmission of air, comprising a flexible rubber body portion, an internal pressure resisting spiral spring having a portion substantially embedded in said body portion and vulcanized thereto substantially thruout its length, a metal to rubber air sealing means disposed within said aperture in said valve stem, and means for releasing said air sealing means accessible at an end of said valve stem.

9. A flexible rubber valve stem having a rubber body portion reinforced against radial distention, comprising a longitudinally apertured shaft, a ferrule disposed at one end of said apertured shaft and having a portion vulcanized thereto, a radially inwardly directed dust seal flange forming a part of said ferrule, a dust seal plug for engaging said ferrule flange and deflecting dust and water from entrance into the aperture of said valve stem shaft, a flexible thrust member disposed within said valve stem shaft aperture, a valve seat forming a part of said valve stem shaft rubber body portion, an air valve sealing member releasably engaging said valve seat and contacting said thrust member, means for yieldingly pressing said air valve sealing member into engagement with said valve seat, and means anchored within said valve stem body portion for supporting said air valve sealing member in its engagement with said means for pressing said air valve sealing member into engagement with said valve seat.

10. A flexible valve stem, comprising a flexible rubber valve stem shaft lower portion, a rubber valve stem shaft upper portion, an internal pressure resisting spring embedded in said valve stem shaft upper portion and vulcanized thereto, an air valve positioned within said valve stem shaft lower portion, means for removably securing said valve stem shaft upper portion to said valve stem shaft lower portion, and a flexible thrust member positioned substantially within said valve stem shaft upper portion for actuating said air valve.

ARTHUR KEEFE.